US008607565B2

(12) United States Patent
Sato

(10) Patent No.: US 8,607,565 B2
(45) Date of Patent: Dec. 17, 2013

(54) INTERNAL COMBUSTION ENGINE WITH TURBOCHARGER

(75) Inventor: Akira Sato, Gotenba (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 171 days.

(21) Appl. No.: 13/383,564

(22) PCT Filed: Sep. 29, 2010

(86) PCT No.: PCT/JP2010/066924
§ 371 (c)(1),
(2), (4) Date: Jan. 11, 2012

(87) PCT Pub. No.: WO2012/042609
PCT Pub. Date: Apr. 5, 2012

(65) Prior Publication Data
US 2012/0137677 A1    Jun. 7, 2012

(51) Int. Cl.
*F02D 23/00*    (2006.01)
(52) U.S. Cl.
USPC ............................................. 60/602
(58) Field of Classification Search
USPC ............... 60/600–602, 274–324; 123/198 F
See application file for complete search history.

(56) References Cited

U.S. PATENT DOCUMENTS

| | | | |
|---|---|---|---|
| 6,463,732 B2 * | 10/2002 | Baeuerle et al. | 60/274 |
| 2005/0188682 A1 * | 9/2005 | Fledersbacher et al. | 60/284 |
| 2010/0064686 A1 * | 3/2010 | Mondori | 60/605.2 |
| 2011/0100013 A1 * | 5/2011 | Whitney et al. | 60/285 |
| 2011/0146267 A1 * | 6/2011 | Hepburn et al. | 60/602 |
| 2012/0017572 A1 * | 1/2012 | Tsujimoto et al. | 60/286 |
| 2012/0240571 A1 * | 9/2012 | Otsuka | 60/601 |

FOREIGN PATENT DOCUMENTS

| | | |
|---|---|---|
| JP | 11-062602 | 3/1999 |
| JP | 2000-265893 A | 9/2000 |
| JP | 2002-070536 A | 3/2002 |
| JP | 2006-152878 A | 6/2006 |
| JP | 2007-332849 A | 12/2007 |
| JP | 2007-332872 A | 12/2007 |
| JP | 2009-275527 A | 11/2009 |

OTHER PUBLICATIONS

International Search Report & Written Opinion mailed Nov. 2, 2010 of PCT/P2010/066924.

* cited by examiner

*Primary Examiner* — Thomas Denion
*Assistant Examiner* — Ngoc T Nguyen
(74) *Attorney, Agent, or Firm* — Kenyon & Kenyon LLP

(57) ABSTRACT

An internal combustion engine with a turbocharger that can favorably prevent an exhaust gas purifying catalyst from being clogged with a manganese oxide contained in an exhaust gas is provided. The internal combustion engine includes a turbocharger that includes a turbine disposed in an exhaust passage, the turbine being operative by exhaust energy of the internal combustion engine; an upstream catalyst, disposed in the exhaust passage at a downstream side of the turbine, for purifying an exhaust gas; an exhaust bypass passage for bypassing the turbine; and a waste gate valve for opening or closing the exhaust bypass passage. The waste gate valve is controlled to be in an open state during performance of a fuel cut of the internal combustion engine.

6 Claims, 7 Drawing Sheets

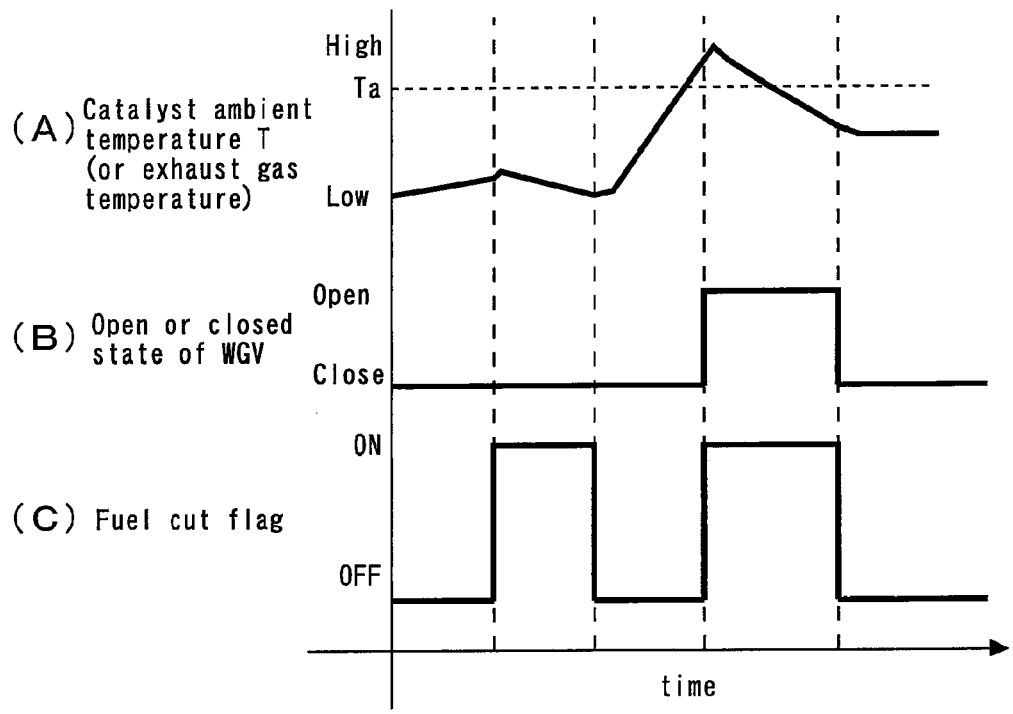
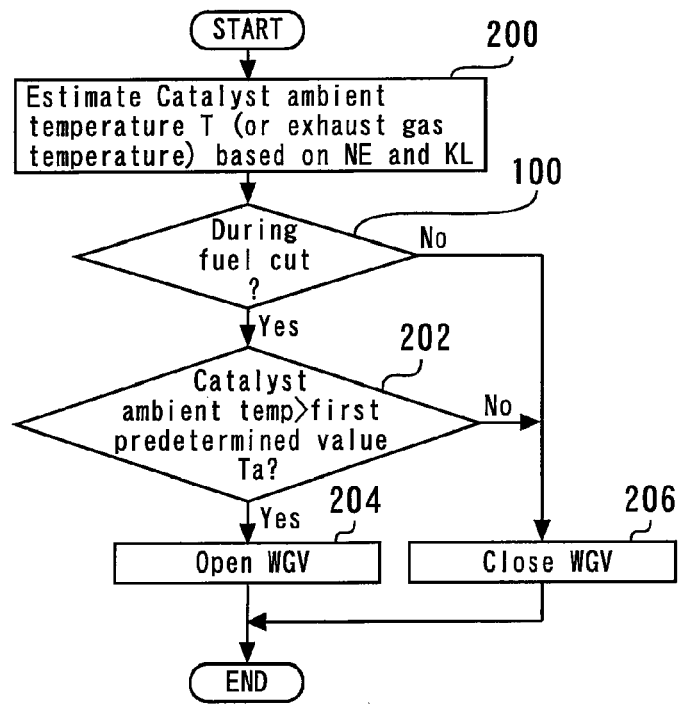

US 8,607,565 B2

INTERNAL COMBUSTION ENGINE WITH TURBOCHARGER

CROSS REFERENCE TO RELATED APPLICATIONS

This is a 371 national phase application of PCT/JP2010/066924 filed 29 Sep. 2010, the contents of which are incorporated herein by reference.

FIELD OF THE INVENTION

The present invention relates to an internal combustion engine with a turbocharger.

BACKGROUND OF THE INVENTION

Patent document 1, for example, discloses a diesel engine including a variable displacement type turbocharger. The known diesel engine includes an exhaust gas purifying catalyst disposed in an exhaust passage at the downstream side of a turbine of the turbocharger.

Including the above described document, the applicant is aware of the following documents as a related art of the present invention.

CITATION LIST

Patent Documents

Patent Document 1: Japanese Laid-open Patent Application Publication No. Hei 11-62602
Patent Document 2: Japanese Laid-open Patent Application Publication No. 2002-70536

SUMMARY OF THE INVENTION

Technical Problem

An exhaust gas discharged from an internal combustion engine may contain a manganese oxide depending on a property of a fuel used. When deposition of the manganese oxide on the exhaust gas purifying catalyst progresses, a problem is posed in that the exhaust gas purifying catalyst is clogged. Such a problem of clogging with the manganese oxide is more conspicuous in an internal combustion engine with a turbocharger. This is because of the following reasons. Specifically, one of major causes for clogging of the exhaust gas purifying catalyst with the manganese oxide is considered that, of components of an exhaust gas flow at an inlet of the exhaust gas purifying catalyst, a component inclined relative to a front end surface of the exhaust gas purifying catalyst (more specifically, a perpendicular component relative to a cell wall near the front end surface) is large. In addition, in the internal combustion engine with a turbocharger, the exhaust gas flow after the turbine is a swirl flow, so that the perpendicular component becomes large at the inlet of the exhaust gas purifying catalyst. As a result, in the internal combustion engine with a turbocharger, the exhaust gas purifying catalyst tends more to be clogged with the manganese oxide.

The present invention has been made to solve the foregoing problem and it is an object of the present invention to provide an internal combustion engine with a turbocharger that can favorably prevent an exhaust gas purifying catalyst from being clogged with a manganese oxide contained in an exhaust gas.

Solution to Problem

A first aspect of the present invention is an internal combustion engine with a turbocharger, comprising:
a turbocharger including a turbine disposed in an exhaust passage, the turbine being operative by exhaust energy of the internal combustion engine;
an exhaust gas purifying catalyst, disposed in the exhaust passage at a downstream side of the turbine, for purifying an exhaust gas;
an exhaust bypass passage for bypassing the turbine;
a bypass valve for opening or closing the exhaust bypass passage; and
bypass valve opening control means for performing, if a fuel cut of the internal combustion engine is to be performed, during at least part of a period of time during which the fuel cut is performed, control to open the bypass valve or to make an opening angle of the bypass valve greater than an opening angle at a start of the fuel cut; and
catalyst temperature acquiring means for detecting or estimating a temperature of the exhaust gas purifying catalyst,
wherein the bypass valve opening control means performs the control to open the bypass valve or to make the opening angle of the bypass valve greater than the opening angle at the start of the fuel cut during the performance of the fuel cut and if the temperature of the exhaust gas purifying catalyst is higher than a first predetermined value.

A second aspect of the present invention is the internal combustion engine with a turbocharger according to the first aspect of the present invention, further comprising:
bypass valve closing control means for performing, at a return from the fuel cut, control to close the bypass valve or to make the opening angle of the bypass valve smaller than the opening angle during the performance of the fuel cut.

A third aspect of the present invention is the internal combustion engine with a turbocharger according to the first aspect of the present invention,
wherein the bypass valve opening control means includes first returning-then-opening control performing means for performing the control to open the bypass valve or to make the opening angle of the bypass valve greater than the opening angle at the start of the fuel cut, if the temperature of the exhaust gas purifying catalyst is higher than a second predetermined value at the return from the fuel cut, the first returning-then-opening control performing means continuing performing the control until the temperature of the exhaust gas purifying catalyst is equal to, or less than, the second predetermined value.

A fourth aspect of the present invention is the internal combustion engine with a turbocharger according to the first or third aspect of the present invention, further comprising:
air fuel ratio control means for controlling an air fuel ratio of the internal combustion engine,
wherein the bypass valve opening control means includes second returning-then-opening control performing means for performing the control to open the bypass valve or to make the opening angle of the bypass valve greater than the opening angle at the start of the fuel cut, if a rich air fuel ratio operation is to be performed with the air fuel ratio set to a side richer than a stoichiometric air fuel ratio by the air fuel ratio control means at the return from the fuel cut.

A fifth aspect of the present invention is the internal combustion engine with a turbocharger according to the fourth aspect of the present invention,
wherein the second returning-then-opening control performing means includes bypass valve closing control means for performing control to close the bypass valve or to make the opening angle of the bypass valve greater than the opening angle during the performance of the fuel cut, if a stoichiometric operation with the air fuel ratio set at the stoichiometric air fuel ratio is selected as changed from the rich air fuel ratio operation after the return from the fuel cut.

Advantageous Effects of Invention

According to the first aspect of the present invention, a flow rate of a gas passing through the turbine is reduced when the fuel cut is performed during which the exhaust gas contains a lot of oil that functions as a binder when the manganese oxide deposits on the exhaust gas purifying catalyst and during which a gas having a high oxygen concentration flows through the exhaust gas purifying catalyst. This allows, of components of an exhaust gas flow at an inlet of the exhaust gas purifying catalyst, a perpendicular component relative to cell walls near a front end surface of the exhaust gas purifying catalyst to be made small. This prevents oil from being adhered to the cell walls (inner wall surface) of the exhaust gas purifying catalyst. Clogging of the exhaust gas purifying catalyst with the manganese oxide can thus be favorably prevented from progressing during operation of the internal combustion engine. Moreover, according to the present invention, by reducing an opportunity or a period of time during which the bypass valve is in the open state during performance of the fuel cut, torque response during acceleration can be prevented from being degraded and deposition of the manganese oxide on the exhaust gas purifying catalyst under high temperature conditions can be prevented from being promoted.

According to the second aspect of the present invention, the control to place the bypass valve in the open state (or to make the opening angle of the bypass valve greater) is performed only during performance of the fuel cut. Torque response during acceleration can therefore be prevented from being degraded and deposition of the manganese oxide on the exhaust gas purifying catalyst can be prevented from being promoted.

According to the third aspect of the present invention, deposition of the manganese oxide on the exhaust gas purifying catalyst under high temperature conditions can be further prevented from being promoted.

According to the fourth aspect of the present invention, the control is performed to place the bypass valve in the open state (or to make the opening angle of the bypass valve greater) under conditions in which an amount of manganese oxides contained in the exhaust gas increases. Clogging of the exhaust gas purifying catalyst with the manganese oxide can therefore be even further prevented.

According to the fifth aspect of the present invention, an opportunity of performing control to place the bypass valve in the open state (or make the opening angle of the bypass valve greater) after a return from the fuel cut is limited to timing during the rich air fuel ratio operation. This allows deposition of the manganese oxide on the exhaust gas purifying catalyst to be prevented from being promoted, while torque response during acceleration can be prevented from being degraded.

BRIEF DESCRIPTION OF THE DRAWINGS

FIG. 4 is a timing chart for illustrating control characteristic according to the second embodiment of the present invention;

FIG. 5 is a flowchart of a routine that is executed in the second embodiment of the present invention;

DETAILED DESCRIPTION

First Embodiment

Figure 1:
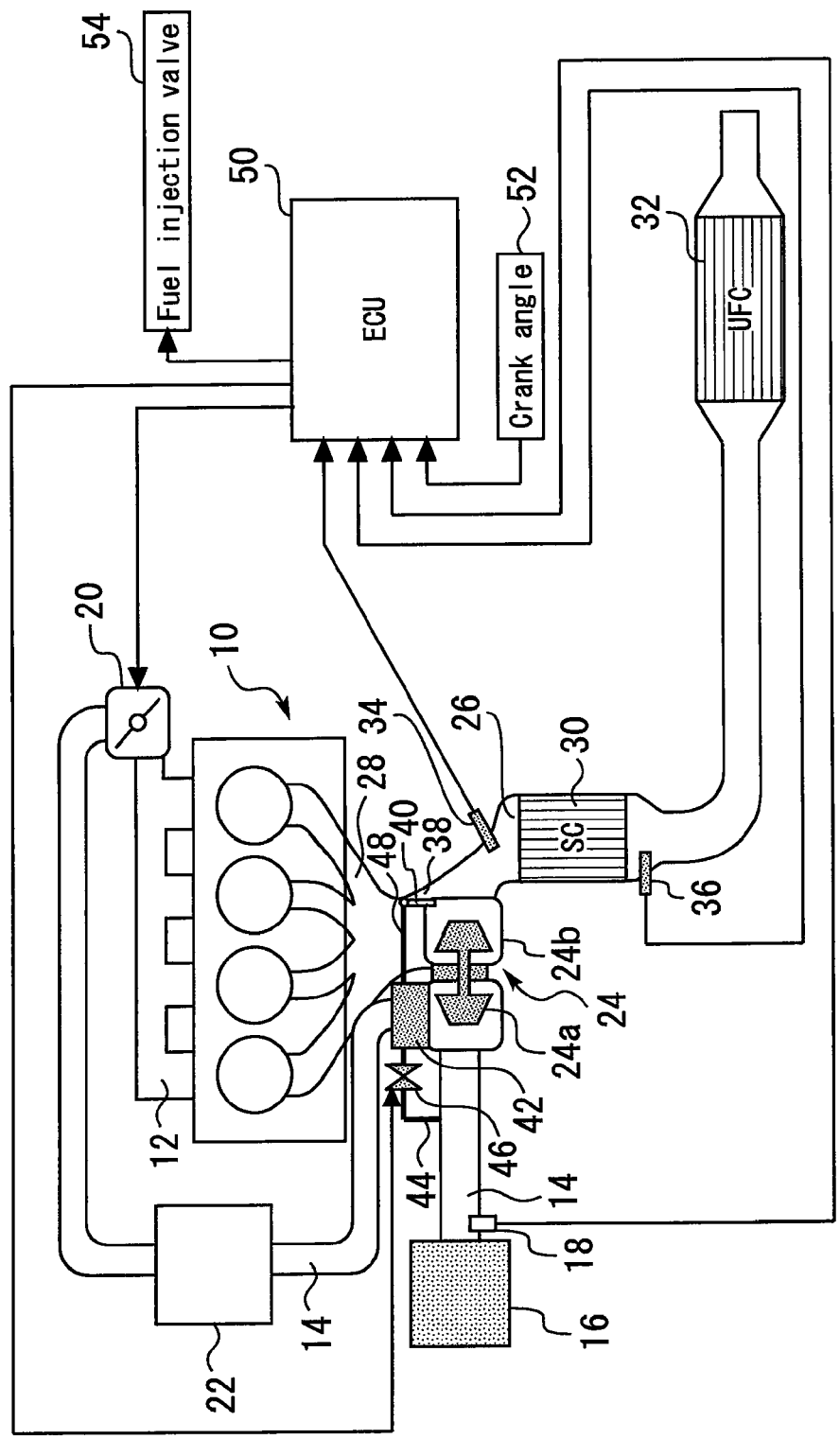
FIG. 1 is a diagram for illustrating a system configuration of an internal combustion engine with a turbocharger according to a first embodiment of the present invention.

[Description of System Configuration]
FIG. 1 is a diagram for illustrating a system configuration of an internal combustion engine 10 with a turbocharger according to a first embodiment of the present invention. The system of the present embodiment includes an internal combustion engine 10. It is supposed herein that the internal combustion engine 10 is, as an example, a gasoline engine. An intake system in the internal combustion engine 10 includes an intake manifold 12 and an intake pipe (intake passage) 14 connected to the intake manifold 12. Air is drawn into the intake pipe 14 from atmospheric air and distributed to a combustion chamber of each cylinder via the intake manifold 12.

An air cleaner 16 is disposed at an inlet of the intake pipe 14. An air flow meter 18 is disposed at a position near the downstream of the air cleaner 16. The air flow meter 18 outputs a signal according to a flow rate of the air drawn into the intake pipe 14. A throttle valve 20 is disposed upstream of the intake manifold 12. An intercooler 22 for cooling compressed air is disposed upstream of the throttle valve 20.

A compressor 24a of a turbocharger 24 is installed in the middle of the intake pipe 14 extending from the air flow meter 18 to the throttle valve 20. The compressor 24a is integrally connected to a turbine 24b via a coupling shaft. The turbine 24b is installed in the middle of an exhaust pipe (exhaust passage) 26 to be described later. The turbine 24b is operative by exhaust energy of the exhaust gas. The compressor 24a is rotatably driven by exhaust energy of the exhaust gas input to the turbine 24b.

An exhaust system in the internal combustion engine 10 includes an exhaust manifold 28 and the exhaust pipe 26 connected to the exhaust manifold 28. The exhaust gas discharged from each cylinder of the internal combustion engine 10 is collected at the exhaust manifold 28 and discharged to the exhaust pipe 26 via the exhaust manifold 28.

At a downstream side of the turbine 16a in the exhaust passage 14, a first front stage catalyst (S/C1) 18, a second front stage catalyst (S/C2) 20 and an underfloor catalyst (U/F) 22 that can purify the exhaust gas are placed in series in order from the upstream side.

At a downstream side of the turbine 24a in the exhaust pipe 26, an upstream catalyst (SC: start catalyst) 30 and a downstream catalyst (UFC: under floor catalyst) 32 are disposed in series in the order from the upstream side. The upstream catalyst 30 and the downstream catalyst 32, disposed in series with each other, serve as an exhaust gas purifying catalyst (here, a three-way catalyst) for purifying the exhaust gas. More specifically, each of these catalysts 30 and 32 is formed into a honeycomb structure including a plurality of cells (not shown) which is defined by cell walls (not shown) and is formed along a flow direction of the exhaust gas. In addition, a main air fuel ratio sensor 34 is disposed upstream of the upstream catalyst 30 and a sub oxygen sensor 36 is disposed between the upstream catalyst 30 and the downstream catalyst 32 (immediately below the upstream catalyst 30). Specifically, the main air fuel ratio sensor 34 produces an output substantially linear relative to an air fuel ratio of the exhaust gas flowing into the upstream catalyst 30. The sub-oxygen sensor 36 produces a rich output when the exhaust gas flowing from the upstream catalyst 30 is richer than a stoichiometric air fuel ratio, and produces a lean output when the exhaust gas is leaner than the stoichiometric air fuel ratio.

An exhaust bypass passage 38 is connected to the exhaust pipe 26. The exhaust bypass passage 38 bypasses the turbine 24b and connects an inlet side and an exit side of the turbine 24b. Further, a waste gate valve (WGV) 40 is disposed at a portion of the exhaust pipe 26 near the turbine 24b. The WGV 40 assumes a bypass valve for opening or closing the exhaust bypass passage 38. The turbocharger 24 is mounted with a pressure-regulating actuator 42 for controlling the WGV 40. An air pipe 44, which has a first end connected to the intake pipe 14 upstream of the compressor 24a, has a second end connected to the actuator 42. A solenoid valve 46 for opening or closing the air pipe 44 is disposed midway the air pipe 44. Through the foregoing arrangements, pressure of air acting on the actuator 42 is adjusted via the air pipe 44 by opening or closing the solenoid valve 46, which allows opening of the WGV 40 to be adjusted via a rod 48. Instead of the pressure-regulating type, the waste gate valve may, for example, be an electrically-operated valve.

A control system in the internal combustion engine 10 includes an ECU (electronic control unit) 50. Various types of sensors for detecting operating conditions of the internal combustion engine 10 are connected to an input section of the ECU 50. The sensors include, but are not limited to, a crank angle sensor 52 for detecting an engine speed, in addition to the air flow meter 18 and the like mentioned earlier. Various types of actuators for controlling the internal combustion engine 10 are connected to an output section of the ECU 50. The actuators include, but are not limited to, a fuel injection valve 54 for supplying each cylinder with fuel, in addition to the throttle valve 20 and the like mentioned earlier.

[Deposition of a Manganese Oxide on Upstream Catalyst]

The exhaust gas discharged from the internal combustion engine 10 may contain a manganese oxide depending on a property of a fuel used (for example, unleaded MMT (methylcyclopentadienyl manganese tricarbonyl) is used as an additive to gasoline). When deposition of the manganese oxide on the upstream catalyst 30 progresses, a problem is posed in that the upstream catalyst 30 is clogged. Such a problem of clogging with the manganese oxide is more conspicuous in an internal combustion engine with a turbocharger, such as the internal combustion engine 10 of the present embodiment. This is because of the following reasons. Specifically, one of major causes for clogging of the upstream catalyst 30 due to the manganese oxide is considered that, of components of an exhaust gas flow at an inlet of the upstream catalyst 30 disposed immediately below the turbine 24b, a component inclined relative to the front end surface of the upstream catalyst 30 (more specifically, a perpendicular component relative to cell walls near the front end surface) is large. In addition, in the internal combustion engine 10 with the turbocharger 24, the exhaust gas flow after the turbine 24b is a swirl flow, so that the perpendicular component becomes large at the inlet of the upstream catalyst 30. As a result, in the internal combustion engine 10 with the turbocharger 24, the upstream catalyst 30 tends more to be clogged with the manganese oxide.

In addition, the manganese oxide deposits on the cell walls of the upstream catalyst 30 with oil (engine oil) that is contained in the exhaust gas and functions as a binder. The deposition of the manganese oxide on the cell walls of the upstream catalyst 30 is promoted, if the upstream catalyst 30 is under a high-temperature and oxidizing atmosphere.

Characteristic Control in the First Embodiment

In order to prevent the upstream catalyst 30 from being clogged with the manganese oxide described above, it is effective to place the WGV 40 in an open state, so that the abovementioned perpendicular component of the exhaust gas flow can be prevented from becoming large. Keeping the WGV 40 open at all times during operation of the internal combustion engine 10 is not, however, preferable, because opening of the WGV 40 reduces the turbine speed, which invites, for example, degraded torque response when the internal combustion engine 10 is required to be accelerated. Control as shown in FIG. 2 is therefore performed in the present embodiment.

Figure 2:
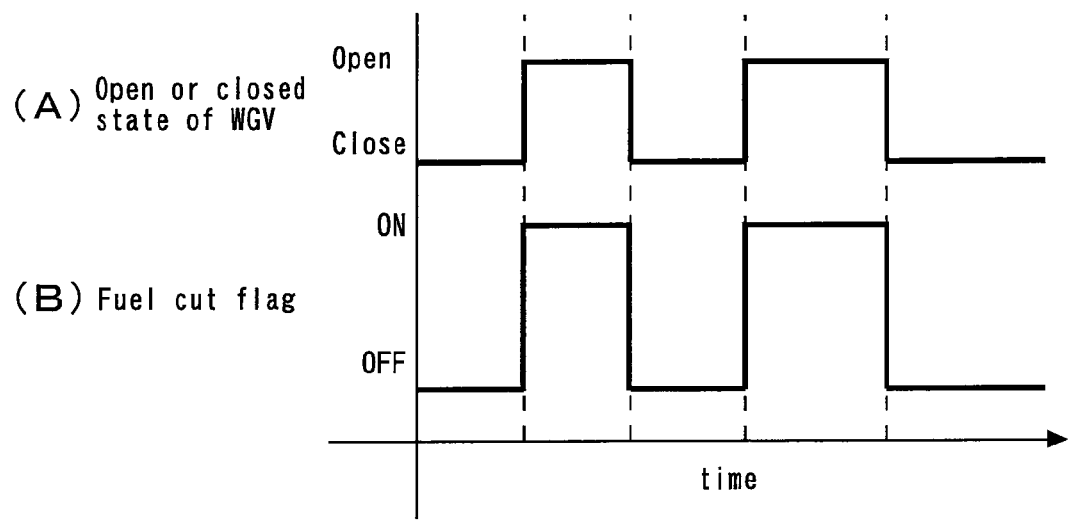
FIG. 2 is a timing chart for illustrating control characteristic according to the first embodiment of the present invention.

FIG. 2 is a timing chart for illustrating control characteristic according to the first embodiment of the present invention. More specifically, FIG. 2(A) shows a waveform that represents an open or closed state of the WGV 40 and FIG. 2(B) shows a waveform that represents whether a fuel cut flag is ON, the fuel cut flag being turned ON if a predetermined fuel cut authorization condition is met during operation of the internal combustion engine 10.

As shown in FIGS. 2(A) and 2(B), when the fuel cut flag is turned ON, the WGV 40 is changed from the closed state (fully closed state) to the open state (e.g., fully open state). The WGV 40 is thereafter returned to the closed state at the time of returning from a fuel cut as a result of the fuel cut flag being turned OFF.

During performance of the fuel cut, the throttle valve 20 is closed, so that negative pressure develops in the cylinder, thus making an oil ascent tend to occur. As a result, during the performance of the fuel cut, the exhaust gas discharged from the cylinder tends to contain a lot of oil in mist form that functions as a binder when the manganese oxide deposits in the upstream catalyst 30. Further, during the performance of the fuel cut during which a fresh mixture having a high oxygen concentration circulates through the upstream catalyst 30, the upstream catalyst 30 is subjected to an oxidizing atmosphere, which promotes deposition of the manganese oxide. The control according to the present embodiment, however, controls the WGV 40 to be in the open state during the performance of the fuel cut in which the exhaust gas contains a lot of such an oil mist and in which a gas (fresh air) having a high oxygen concentration circulates through the upstream catalyst 30, thereby reducing a flow rate of the gas passing through the turbine 24b. The abovementioned perpendicular component of the exhaust gas flow can thereby be made small, which prevents oil from being adhered to the cell walls (inner wall surface) of the upstream catalyst 30. The above described control can thus prevent the adhesion of oil to the upstream catalyst 30 which is a cause of the deposition of the manganese oxide on the upstream catalyst 30. Clogging of the upstream catalyst 30 with the manganese oxide can thus be favorably prevented from progressing during operation of the internal combustion engine 10.

Figure 3:
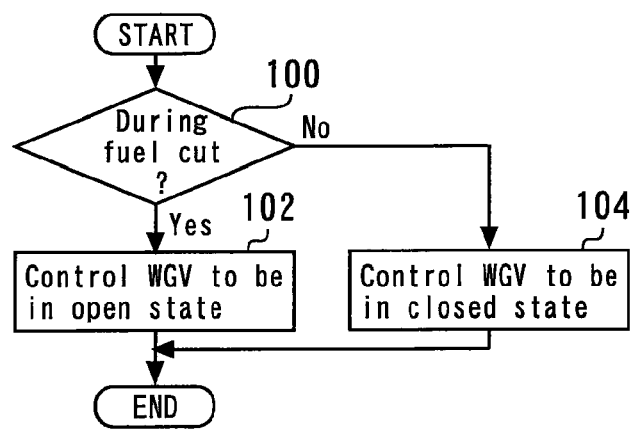
FIG. 3 is a flowchart of a routine that is executed in the first embodiment of the present invention.

FIG. 3 is a flow chart showing a control routine performed by the ECU 50 to achieve the control according to the present first embodiment. It is noted that the routine is to be performed periodically at predetermined intervals during starting of the internal combustion engine 10.

In the routine shown in FIG. 3, it is first determined whether a fuel cut is being performed based on the state of the fuel cut flag (step 100).

If it is, as a result, determined that the fuel cut is being performed, the WGV 40 is controlled to be (or maintained) in the open state (step 102). If, on the other hand, it is determined in step 100 that the fuel cut is not being performed, the WGV 40 is controlled to be (or maintained) in the closed state (step 104).

According to the routine of FIG. 3 described above, control is performed to change the state of the WGV 40 from the closed state to the open state at a start of the fuel cut and to maintain the WGV 40 in the open state during performance of the fuel cut. Then, at the time of a return from the fuel cut, the WGV 40 that has been in the open state is switched to the closed state. This allows the perpendicular component of the exhaust gas flow to be made small during performance of the fuel cut as described earlier. Clogging of the upstream catalyst 30 with the manganese oxide can thus be favorably prevented through prevention of oil from being adhered to the upstream catalyst 30.

It is noted that in the first embodiment described above, the upstream catalyst 30 corresponds to the "exhaust gas purifying catalyst" in the first aspect of the present invention and the WGV 40 corresponds to the "bypass valve" in the first aspect of the present invention. Similarly, performance of the processes of steps 100 and 102 by the ECU 50 achieves the "bypass valve opening control means" in the first aspect of the present invention.

Additionally, performance of the processes of steps 100 and 104 by the ECU 50 achieves the "bypass valve closing control means" in the second aspect of the present invention.

Second Embodiment

A second embodiment of the present invention will be described below with reference to FIGS. 4 and 5.

A system of the present embodiment can be achieved by using the hardware configuration shown in FIG. 1 to let the ECU 50 perform a routine shown in FIG. 5 to be described later instead of the routine shown in FIG. 3.

FIG. 4 is a timing chart for illustrating control characteristic according to the second embodiment of the present invention. More specifically, FIG. 4(A) shows a waveform that represents changes in a catalyst ambient temperature T (or exhaust gas temperature). FIG. 4(B) shows a waveform that represents an open or closed state of the WGV 40. FIG. 4(C) shows a waveform that represents whether a fuel cut flag is ON.

As described earlier, the deposition of the manganese oxide on the upstream catalyst 30 is promoted when the ambient temperature of the upstream catalyst 30 (hereinafter may be referred to simply as the "catalyst ambient temperature T") is high. In addition, opening the WGV 40 reduces the turbine speed. To ensure sufficient torque response when acceleration is requested upon returning from a fuel cut, therefore, the WGV 40 should ideally be closed wherever feasible even during performance of the fuel cut.

In the present embodiment, therefore, the WGV 40 is controlled to be in the open state, if the fuel cut is being performed and the catalyst ambient temperature T is higher than a first predetermined value Ta. It is to be noted that FIG. 4 shows an example in which, if the catalyst ambient temperature T is higher than the first predetermined value Ta when the fuel cut flag is turned ON (specifically, at the start of the fuel cut), the WGV 40 is kept continuously in the open state during the fuel cut even when the catalyst ambient temperature T becomes equal to, or less than, the first predetermined value Ta during the fuel cut.

FIG. 5 is a flow chart showing a control routine performed by the ECU 50 to achieve the control according to the present second embodiment. It is noted that in FIG. 5, the same steps as those shown in FIG. 3 in the first embodiment are identified by the same reference numerals and descriptions therefor will be omitted or simplified.

In the routine shown in FIG. 5, a current catalyst ambient temperature T is estimated (calculated) based on an engine speed NE, and an engine load factor KL calculated based on an intake air quantity and the like (step 200). It is noted that such estimation is not the only possible method for acquiring the catalyst ambient temperature T; and, the upstream catalyst 30 may be separately provided with a temperature sensor and the catalyst ambient temperature T may be detected using the temperature sensor.

Next, it is determined in step 100 whether a fuel cut is being performed. If it is determined, as a result, that the fuel cut is being performed, it is then determined whether the catalyst ambient temperature T acquired in step 200 is higher than the first predetermined value Ta (step 202). The first predetermined value Ta in step 202 is a value set previously as a guide for determining whether the WGV 40 is to be opened during the fuel cut in relation to the catalyst ambient temperature T.

If it is determined in step 202 that the catalyst ambient temperature T is higher than the first predetermined value Ta, the WGV 40 is controlled to be (or maintained) in the open state (step 204). If, on the other hand, it is determined in step 202 that the catalyst ambient temperature T is equal to, or less than, the first predetermined value Ta, the WGV 40 is controlled to be (or maintained) in the closed state even during performance of the fuel cut (step 206).

In the routine shown in FIG. 5 described above, the WGV 40 is changed from the closed state to the open state, only if the fuel cut is being performed and the catalyst ambient temperature T is higher than the first predetermined value Ta. By reducing an opportunity or a period of time during which the WGV 40 is in the open state during the fuel cut in this manner, torque response during acceleration can be prevented from being degraded and deposition of the manganese oxide on the upstream catalyst 30 under high temperature conditions can be prevented from being promoted.

It is noted that in the second embodiment described above, performance of the process of step 200 by the ECU 50 achieves the "catalyst temperature acquiring means" in the first aspect of the present invention.

Third Embodiment

A third embodiment of the present invention will be described below with reference to FIGS. 6 and 7.

A system of the present embodiment can be achieved by using the hardware configuration shown in FIG. 1 to let the ECU 50 perform a routine shown in FIG. 7 to be described later instead of the routine shown in FIG. 5.

Figure 6:
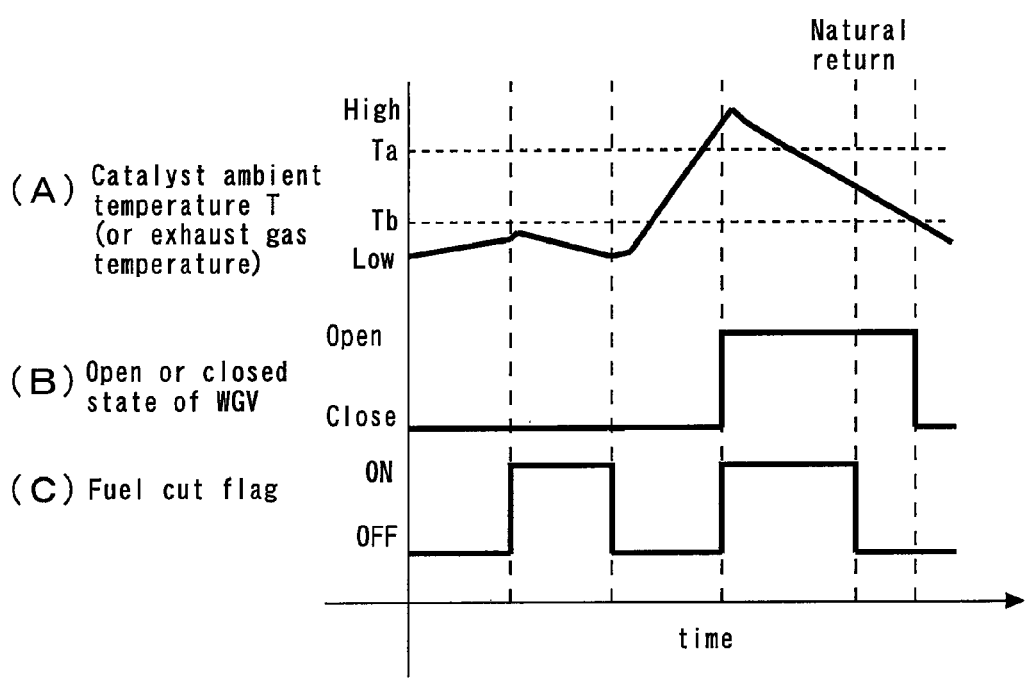
FIG. 6 is a timing chart for illustrating control characteristic according to the third embodiment of the present invention.

FIG. 6 is a timing chart for illustrating control characteristic according to the third embodiment of the present invention. More specifically, FIG. 6(A) shows a waveform that represents changes in the catalyst ambient temperature T (or exhaust gas temperature). FIG. 6(B) shows a waveform that represents an open or closed state of the WGV 40. FIG. 6(C) shows a waveform that represents whether a fuel cut flag is ON.

Modes of returning from the fuel cut in the internal combustion engine 10 include one triggered by an acceleration request issued from a driver (what is called a forced return) and one triggered by the engine speed being reduced down to a predetermined speed near an idling speed (what is called a natural return). Referring to FIG. 6, in the present embodiment, in addition to the control of the second embodiment described above, control is performed to keep the WGV 40 in the open state if the catalyst ambient temperature T is higher than a second predetermined value Tb (<the first predetermined value Ta) upon a natural return from the fuel cut, until the catalyst ambient temperature T becomes lower than the second predetermined value Tb even during time following a return from the fuel cut. It is noted that FIG. 6 shows an example in which, if the catalyst ambient temperature T is higher than the first predetermined value Ta when the fuel cut flag is turned ON (specifically, at the start of the fuel cut), the WGV 40 is kept continuously in the open state up to a return from the fuel cut and is further continuously kept in the open state until the catalyst ambient temperature T becomes equal to, or less than, the second predetermined value Tb after the return from the fuel cut.

Figure 7:
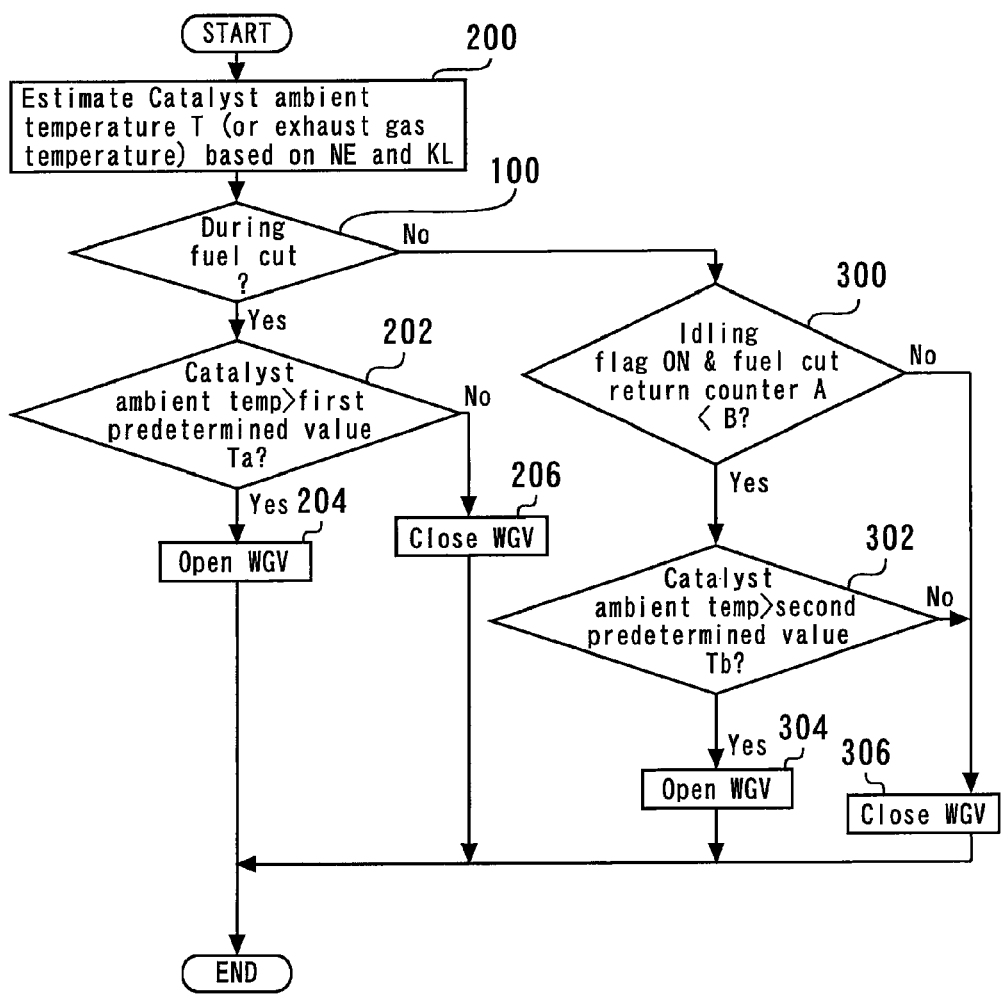
FIG. 7 is a flowchart of a routine that is executed in the third embodiment of the present invention.

FIG. 7 is a flow chart showing a control routine performed by the ECU 50 to achieve the control according to the present third embodiment. It is noted that in FIG. 7, the same steps as those shown in FIG. 5 in the second embodiment (specifically, steps 200, 100, and 202 to 206) are identified by the same reference numerals and descriptions therefor will be omitted or simplified.

In the routine shown in FIG. 7, if it is determined in step 100 that the fuel cut is not being performed, it is then determined whether an idling flag is turned ON and a fuel cut return counter A is smaller than a predetermined value B (step 300). The idling flag is used to determine whether an accelerator pedal is at an idling position. The fuel cut return counter A is started at a point in time at which the return from the fuel cut is started, and counted using a timer function of the ECU 50, an integrated intake air quantity or the like. The predetermined value B is a threshold value for determining, using the fuel cut return counter A, whether a current moment is at or immediately after a return from the fuel cut.

If it is determined in step 300 noted above that the idling flag is ON and the fuel cut return counter A is smaller than the predetermined value B, it can then be determined that no request for acceleration is issued from the driver at the current moment and the current moment is at or immediately after a return from the fuel cut. Specifically, in this case, it can be determined that the current moment is at the time of a natural return from a fuel cut or immediately after a natural return with no request for acceleration. In this case, it is next determined whether the catalyst ambient temperature T is higher than the second predetermined value Tb (step 302). The second predetermined value Tb in step 302 is a value set previously as a guide for determining whether the WGV 40 is to be returned to the closed state after a natural return from the fuel cut in relation to the catalyst ambient temperature T.

If it is determined, as a result, that the catalyst ambient temperature T is higher than the second predetermined value Tb, control is continued to maintain the WGV 40 in the open state (step 304). If, on one hand, it is determined that the catalyst ambient temperature T is equal to, or less than, the second predetermined value Tb, the WGV 40 is controlled to be in the closed state (step 306).

If, on one hand, determination in step 300 described above does not hold, specifically, if the current moment is not at or immediately after a natural return from the fuel cut (e.g., at the time of a forced return from the fuel cut), the WGV 40 is controlled to be (or be maintained) in the closed state (step 306).

According to the routine of FIG. 7 described above, if the catalyst ambient temperature T is higher than the second predetermined value Tb during a natural return from the fuel cut, the WGV 40 is controlled to be in the open state until the ambience of the upstream catalyst 30 cools down to the second predetermined value Tb or less. This allows the deposition of the manganese oxide on the upstream catalyst 30 under high temperature conditions to be further prevented from being promoted.

According to the above described routine, the mode of returning from the fuel cut is taken into consideration and the control to place the WGV 40 in the open state after the return from the fuel cut is limited to timing during the natural return. This allows torque response to be avoided from being degraded at the time of a forced return triggered by an acceleration request.

It is noted that in the third embodiment described above, performance of a series of processes of steps 100, and from 300 to 306 by the ECU 50 achieves the "first returning-then-opening control performing means" in the third aspect of the present invention.

Fourth Embodiment

A fourth embodiment of the present invention will be described below with reference to FIGS. 8 and 9.

A system of the present embodiment can be achieved by using the hardware configuration shown in FIG. 1 to let the ECU 50 perform a routine shown in FIG. 9 to be described later instead of the routine shown in FIG. 5.

Figure 8:
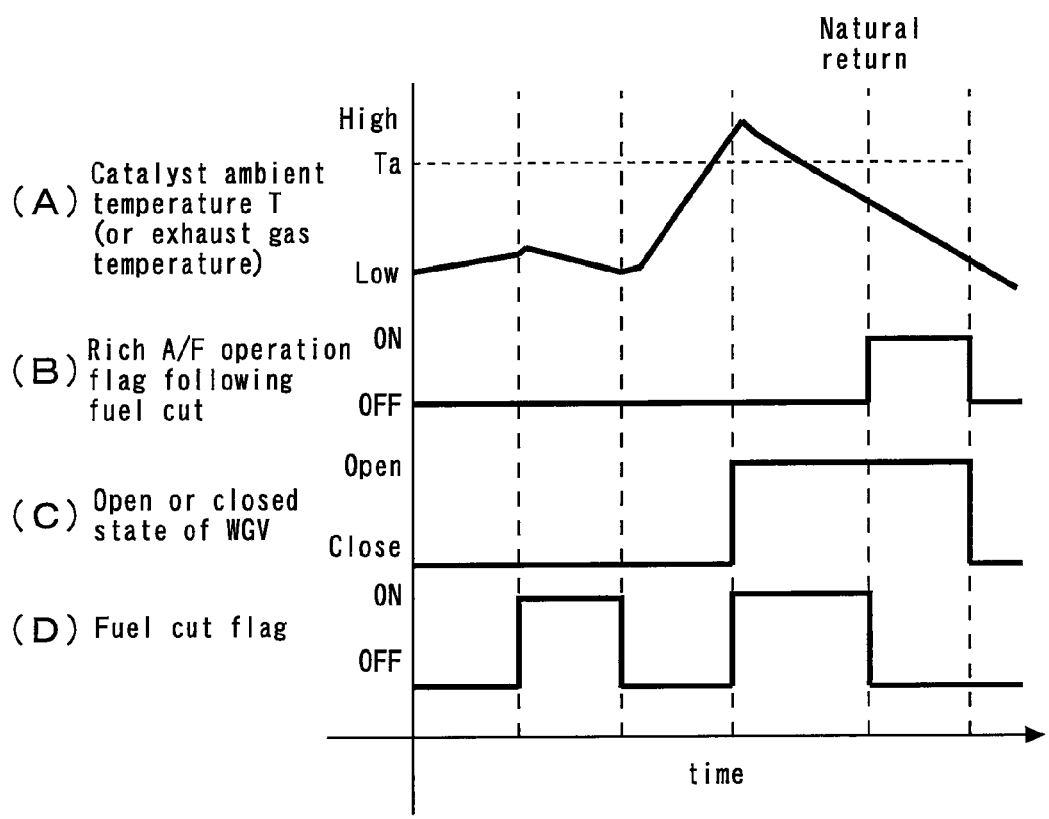
FIG. 8 is a timing chart for illustrating control characteristic according to the fourth embodiment of the present invention.

FIG. 8 is a timing chart for illustrating control characteristic according to the fourth embodiment of the present invention. More specifically, FIG. 8(A) shows a waveform that represents changes in the catalyst ambient temperature T (or exhaust gas temperature). FIG. 8(B) shows a waveform that represents whether a rich A/F operation flag following a return from a fuel cut is turned ON, the flag being turned ON if a predetermined condition is met for performing a rich A/F operation by controlling so as to vary the air fuel ratio to a side richer than the stoichiometric air fuel ratio after a fuel cut. FIG. 8(C) shows a waveform that represents whether the WGV 40 is in the open or closed state. FIG. 8(D) shows a waveform that represents whether a fuel cut flag is ON.

In the internal combustion engine 10, a rich A/F operation may be performed in order to reduce NOx following a natural return from the fuel cut, provided that a predetermined condition for performance is met. Performance of such a rich A/F operation increases an amount of manganese oxides contained in the exhaust gas. In the present embodiment, therefore, as shown in FIG. 8, control is performed to place the WGV 40 in the open state if the rich A/F operation flag following a return from a fuel cut is ON at the time of a natural return from the fuel cut, until the flag is turned OFF even during time following a return from the fuel cut. It is noted that FIG. 8 shows an example in which, if the catalyst ambient temperature T is higher than the first predetermined value Ta when the fuel cut flag is turned ON (specifically, at the start of the fuel cut), the WGV 40 is kept continuously in the open state up to a return from the fuel cut and is further continuously kept in the open state during the rich A/F operation after the return from the fuel cut.

Figure 9:
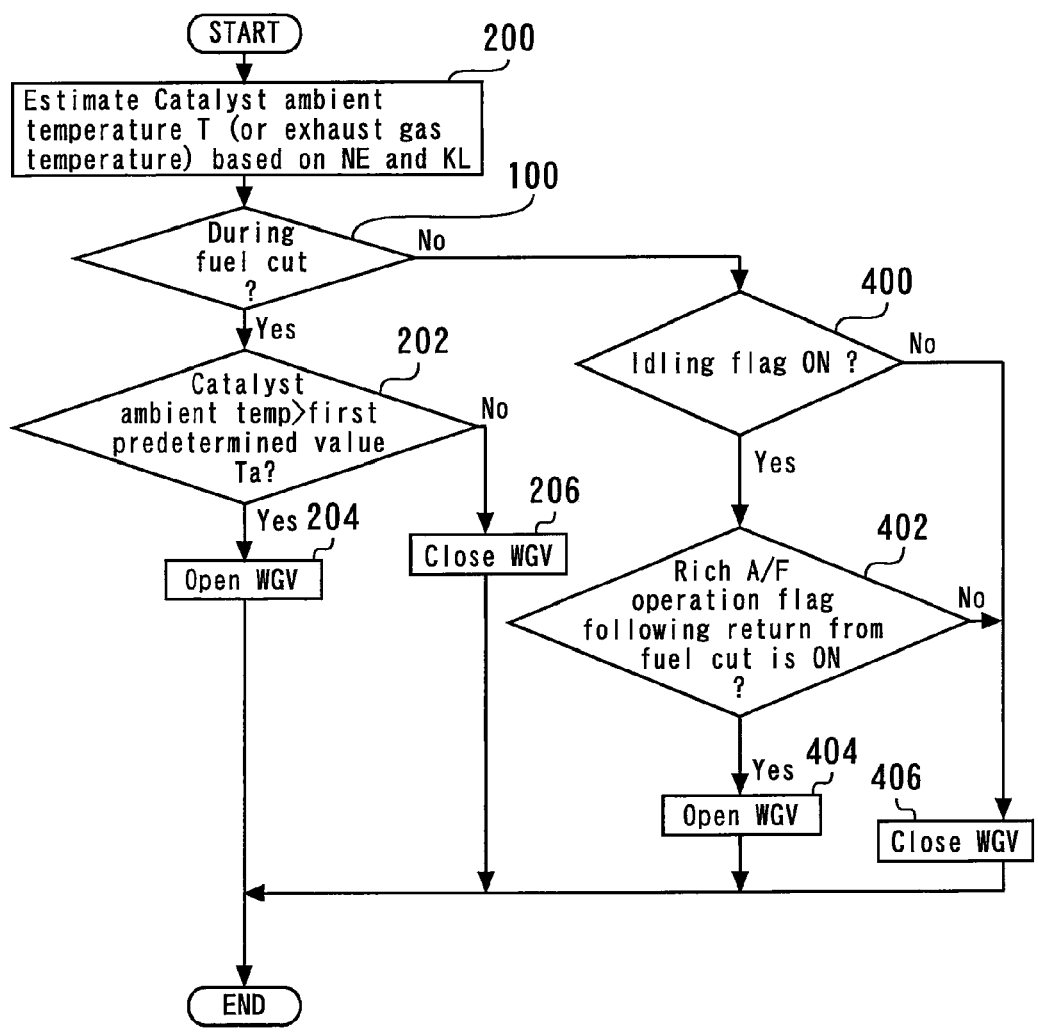
FIG. 9 is a flowchart of a routine that is executed in the fourth embodiment of the present invention.

FIG. 9 is a flow chart showing a control routine performed by the ECU 50 to achieve the control according to the present fourth embodiment. It is noted that in FIG. 9, the same steps as those shown in FIG. 5 in the second embodiment (specifically, steps 200, 100, and 202 to 206) are identified by the same reference numerals and descriptions therefor will be omitted or simplified.

In the routine shown in FIG. 9, if it is determined in step 100 that the fuel cut is not being performed, it is then determined whether an idling flag is turned ON (step 400). If, as a result, it is determined that the idling flag is turned ON, specifically, an acceleration request is not issued, it is then determined whether the rich A/F operation flag following a return from a fuel cut is turned ON (step 402).

If it is determined in step 402 that the rich A/F operation flag following a return from a fuel cut is ON, it can then be determined that a rich A/F operation is now to be performed upon a natural return with no acceleration request issued. In this case, control is performed to place the WGV 40 in the open state (step 404). If, on the other hand, it is determined in step 402 that the rich A/F operation flag following a return from a fuel cut is not ON (specifically, a stoichiometric operation (ordinary operation) with an air fuel ratio at the stoichiometric air fuel ratio is performed following completion of the rich A/F operation after a natural return), the WGV 40 is controlled to be (or maintained) in the closed state (step 406).

According to the routine shown in FIG. 9 described above, if the rich A/F operation involving a large amount of manganese oxides contained in the exhaust gas is performed at the time of a natural return from the fuel cut, control is performed to place the WGV 40 in the open state. This further prevents the upstream catalyst 30 from being clogged with the manganese oxide.

According to the routine described above, when the ordinary stoichiometric operation is selected after performance of the rich A/F operation, the WGV 40 is changed from the open state to the closed state. The WGV 40 is placed in the open state during the rich A/F operation, which prevents the upstream catalyst 30 from being clogged and helps prevent torque response from being degraded.

Meanwhile, in the above-described fourth embodiment, if the rich A/F operation is performed at the time of the natural return from the fuel cut, the WGV 40 is controlled to be in the open state even after the return from the fuel cut. The control of the fourth embodiment may even be combined with the control of the third embodiment as appropriately.

It is noted that in the above described fourth embodiment, control of the air fuel ratio by the ECU 50 through control of a fuel injection quantity using the fuel injection valve 54 based on an output from, for example, the main air fuel ratio sensor 34 achieves the "air fuel ratio control means" in the fourth aspect of the present invention and performance of a series of processes of steps 100 and from 400 to 406 by the ECU 50 achieves the "second returning-then-opening control performing means" in the fourth aspect of the present invention.

Additionally, performance of processes of steps 402 and 406 by the ECU 50 achieves the "bypass valve closing control means" in the fifth aspect of the present invention.

In the first to fourth embodiments described above, the WGV 40 is controlled to be changed from the closed state to the open state when the fuel cut is performed. In the first embodiment, the WGV 40 is controlled to be changed from the open state to the closed state at the time of a return from the fuel cut (at a predetermined timing in the control of the second to fourth embodiments in the other embodiments). However, modes of controlling the bypass valve of the present invention in relation to performance of the fuel cut are not limited to the foregoing. Specifically, if the bypass valve (e.g., WGV 40) is open to a predetermined opening angle according to an operating condition of the internal combustion engine at the start of the fuel cut, the opening of the bypass valve during performance of the fuel cut may be controlled to be larger than that at the start of the fuel cut. In addition, at the time of a return from the fuel cut, when the catalyst temperature becomes the second predetermined value or less after the return from the fuel cut, or when the rich A/F operation is changed to the stoichiometric operation after the return from the fuel cut, the bypass valve may be controlled to an opening angle smaller than that during performance of the fuel cut (specifically, an opening angle according to the operating condition of the internal combustion engine at that particular point in time), instead of placing the bypass valve in the fully closed state.

Additionally, in the second to fourth embodiments described above, control is performed based on the catalyst ambient temperature T. However, the catalyst temperature used in the control according to the present invention is not limited only to the catalyst ambient temperature T acquired through the method described earlier. A value substituting a measured exhaust gas temperature, a detected or estimated catalyst bed temperature or the like may be used.

DESCRIPTION OF SYMBOLS

10 internal combustion engine
14 intake pipe
18 air flow meter
20 throttle valve
24 turbocharger
24a compressor
24b turbine
26 exhaust pipe
30 upstream catalyst (SC)
32 downstream catalyst (UFC)
34 main air fuel ratio sensor
36 sub oxygen sensor
38 exhaust bypass passage
40 waste gate valve (WGV)
42 actuator of WGV
44 air pipe
46 solenoid valve
48 rod
50 electronic control unit (ECU)
52 crank angle sensor
54 fuel injection valve

The invention claimed is:

1. An internal combustion engine with a turbocharger, comprising:

a turbocharger including a turbine disposed in an exhaust passage, the turbine being operative by exhaust energy of the internal combustion engine;

an exhaust gas purifying catalyst, disposed in the exhaust passage at a downstream side of the turbine, for purifying an exhaust gas;

an exhaust bypass passage for bypassing the turbine;

a bypass valve for opening or closing the exhaust bypass passage;

a bypass valve opening control unit for performing, if a fuel cut of the internal combustion engine is to be performed, during at least part of a period of time during which the fuel cut is performed, control to open the bypass valve or to make an opening angle of the bypass valve greater than an opening angle at a start of the fuel cut; and a catalyst temperature acquiring unit that detects or estimates a temperature of the exhaust gas purifying catalyst, wherein the bypass valve opening control unit performs the control to open the bypass valve or to make the opening angle of the bypass valve greater than the opening angle at the start of the fuel cut during the performance of the fuel cut and if the temperature of the exhaust gas purifying catalyst is higher than a first predetermined value.

2. An internal combustion engine with a turbocharger, comprising:

a turbocharger including a turbine disposed in an exhaust passage, the turbine being operative by exhaust energy of the internal combustion engine;

an exhaust gas purifying catalyst, disposed in the exhaust passage at a downstream side of the turbine, for purifying an exhaust gas;

an exhaust bypass passage for bypassing the turbine;

a bypass valve for opening or closing the exhaust bypass passage; and bypass valve opening control means for performing, if a fuel cut of the internal combustion engine is to be performed, during at least part of a period of time during which the fuel cut is performed, control to open the bypass valve or to make an opening angle of the bypass valve greater than an opening angle at a start of the fuel cut; and catalyst temperature acquiring means for detecting or estimating a temperature of the exhaust gas purifying catalyst, wherein the bypass valve opening control means performs the control to open the bypass valve or to make the opening angle of the bypass valve greater than the opening angle at the start of the fuel cut during the performance of the fuel cut and if the temperature of the exhaust gas purifying catalyst is higher than a first predetermined value.

3. The internal combustion engine with a turbocharger according to claim 2, further comprising:

bypass valve closing control means for performing, at a return from the fuel cut, control to close the bypass valve or to make the opening angle of the bypass valve smaller than the opening angle during the performance of the fuel cut.

4. The internal combustion engine with a turbocharger according to claim 2, wherein the bypass valve opening control means includes first returning-then-opening control performing means for performing the control to open the bypass valve or to make the opening angle of the bypass valve greater than the opening angle at the start of the fuel cut, if the temperature of the exhaust gas purifying catalyst is higher than a second predetermined value at the return from the fuel cut, the first returning-then-opening control performing means continuing performing the control until the temperature of the exhaust gas purifying catalyst is equal to, or less than, the second predetermined value.

5. The internal combustion engine with a turbocharger according to claim 2, further comprising:

air fuel ratio control means for controlling an air fuel ratio of the internal combustion engine, wherein the bypass valve opening control means includes second returning-then-opening control performing means for performing the control to open the bypass valve or to make the opening angle of the bypass valve greater than the opening angle at the start of the fuel cut, if a rich air fuel ratio operation is to be performed with the air fuel ratio set to a side richer than a stoichiometric air fuel ratio by the air fuel ratio control means at the return from the fuel cut.

6. The internal combustion engine with a turbocharger according to claim 5, wherein the second returning-then-opening control performing means includes bypass valve closing control means for performing control to close the bypass valve or to make the opening angle of the bypass valve greater than the opening angle during the performance of the fuel cut, if a stoichiometric operation with the air fuel ratio set at the stoichiometric air fuel ratio is selected as changed from the rich air fuel ratio operation after the return from the fuel cut.

* * * * *